(12) United States Patent
Yatsenko et al.

(10) Patent No.: US 7,444,998 B2
(45) Date of Patent: Nov. 4, 2008

(54) HYDROGEN-OXYGEN PLASMA ENGINES AND DOSING METHODS THEREFOR

(76) Inventors: Yuriy Yatsenko, 7639 Loretto Ave., Philadelphia, PA (US) 19111; Aleksandr Smushkovich, 305 Bay 20th St., Brooklyn, NY (US) 11214

( * ) Notice: Subject to any disclaimer, the term of this patent is extended or adjusted under 35 U.S.C. 154(b) by 250 days.

(21) Appl. No.: 11/454,448

(22) Filed: Jun. 17, 2006

(65) Prior Publication Data

US 2007/0289560 A1    Dec. 20, 2007

(51) Int. Cl.
*F02B 43/08* (2006.01)
(52) U.S. Cl. .............. 123/536; 123/3; 123/518; 123/531; 123/539
(58) Field of Classification Search .......... 123/2, 123/3, 25 A–25 F, 41.01, 299, 431, 536, 198 A, 123/DIG. 12; 205/628; 204/193, 194, 279, 204/280, 282, 283
See application file for complete search history.

(56) References Cited

U.S. PATENT DOCUMENTS 7,273,044 B2 *   9/2007   Flessner et al. ............. 123/536

2007/0215070 A1 *   9/2007   Yatsenko ................. 123/3

* cited by examiner

*Primary Examiner*—Quang D. Thanh
*Assistant Examiner*—Hung Q Nguyen (57) ABSTRACT

Disclosed embodiments of proposed hydrogen-oxygen and hydrogen-air engines are usable in automotive, power-producing, and other industries. The engines comprise cylinders; water dissociation units, including thermo-impact transformers and possibly electrolyzers; ionic dividers separating hydrogen and oxygen ions; injection chambers configured to inject hydrogen and oxygen/air doses in response to an operator's action and according to proposed dosing methods accounting a hydrogen-oxygen optimal ratio suitable for an explosive plasma reaction in the cylinders, increasing engines torque, eliminating/reducing pollutions. Determination of optimal ratios for hydrogen-air mixtures is also discussed. The dosing methods include algorithms for computing termination injection pressures for hydrogen-oxygen /air doses. Different hydrogen-oxygen/air delivery system are described in conjunction with modified dosing methods. The delivery systems are exemplarily connected to hydrogen and oxygen tanks, or to a hydrogen tank and a compressed-air container variously communicating with the ionic dividers.

6 Claims, 6 Drawing Sheets

HYDROGEN-OXYGEN PLASMA ENGINES AND DOSING METHODS THEREFOR

TECHNICAL FIELD

The present invention relates to methods and devices for obtaining motion power and heat energy from chemical reactions, more specifically to methods and devices utilizing reactions of hydrogen with oxygen to power various machines and generators. It is usable in automotive, power-production, chemical, and other industries.

BACKGROUND OF THE INVENTION

Since Henry Cavendish's discovery of "flammable air" in 1766 (named "hydrogen" by Antoine Lavoisier in 1783), hydrogen is widely used in chemical synthesis, in hydrocracking of natural hydrocarbons, in food industry, in welding, as a rocket fuel, etc. There have been a lot of efforts to develop new technologies based on the use of hydrogen in automobile and other engines, since it might provide a powerful and clean source of energy. It would improve the environment by reducing air pollution necessarily produced by burning hydrocarbon fuels, reduce people's oil dependency by limiting the consumption of oil-based products for energy generating, save natural oil supply in the earth that is gradually depleting for other productive purposes, and also would drive down gasoline prices and other consumer prices dependent on the oil price.

Some world-renowned carmakers (such as BMW, Mazda, etc.) propose hybrid solutions combining traditional fuels (e.g. gasoline) of internal combustion engines with hydrogen. These technologies require means for production, storage, and utilization of hydrogen for the engines. Many U.S. patents describe different devices and methods dedicated to the hydrogen and hybrid technologies.

For example, U.S. Pat. No. 4,625,681 to Uozumi Sutekiyo teaches that "Comparison of this volume with the above-mentioned upper limit of hydrogen concentration ($C_2$ .perspectiveto.75%) shows that the use of air as a source of oxygen allows complete combustion of hydrogen during a gas explosion reaction only when the hydrogen concentration is less than about 30%, and that there would be an oxygen deficiency in the range above that hydrogen concentration." The Sutekiyo's patent is hereby incorporated by reference in its entirety.

It further states that "The detonation reaction can be expressed with the simple reaction formula $2H_2 + O_2 \text{.fwdarw.} 2H_2O$, in which much heat of reaction is produced, that is, $2H_2(g) + O_2(g) \text{.fwdarw.} 2H_2O(g) + 115.6$ Kcal (1). In this case, the heat generated amounts to more than twice that of gasoline per gram. The reaction may seem simple at first glance, however the mechanism itself is a complicated chain reaction involving the free radicals H., O. and .OH. The characteristic curve taken at temperature T.perspectiveto.770.degree. K. in FIG. 2 indicates that no explosion occurs when the pressure P is in zone $Z_1$, below about $5.3 \times 10^2$ Pa. What is called a low pressure explosion takes place in zone $Z_2$, from zone $Z_1$ to about $5.3 \times 10^3$ Pa. No explosion occurs in zone $Z_3$, from zone $Z_2$ to about $8.0 \times 10^4$ Pa. However, when the pressure P exceeds this latter figure, i.e., in zone $Z_4$, a high-pressure explosion (also called a thermal explosion) occurs."

Thusly, the thermal explosion reaction takes place when the pressure is higher 80,000 Pa (the normal atmosphere pressure is 101,000 Pa) at a temperature level of 770.degree. K or about 500.degree. C. This gives an opportunity to build an engine based on the explosion hydrogen-oxygen reaction, wherein the reactants (hydrogen and oxygen) used in the reaction in the optimum proportion providing the most efficient energy outcome. Such engine would also be essentially free of environment pollutions.

What is the way of realization of the opportunity offered by the Sutekiyo's invention? Briefly stating, that invention structure comprises a gasifier furnished with an ultrasonic spray generator, ultrasonic transducer, and an induction heating W-net (with a high-frequency energy source) for transforming liquid water into steam forwarded into a turbo-supercharger. The turbo-supercharger includes a turbo-fan drive motor for drawing the steam into an intake fan, and further into a first discharge section with a high voltage means to obtain an atmospheric discharge producing a first-step (anisothermal) plasma. A second discharge section intakes the plasma, wherein the discharges are conducted in order that the plasma energy at the second step will be more intense, and the plasma is inductively heated from outside of the second discharge section, using high-frequency waves to increase plasma temperature. The exhaust gas (mainly steam) is eventually introduced to the gasifier to provide the waste heat to the gasifier and to supply gaseous water into.

In the other words, there are several different energizing means involved in the process of carrying out the desirable reaction, including: ultrasonic, induction heating, turbo-drawing, first electric discharge, second electric discharge with high frequency waves, exhaust heat utilization, etc. It is believed, that the method and apparatus disclosed in the U.S. Pat. No. 4,625,681 (issued in 1986) are significantly energy consuming, and involve substantial losses of heat produced during the explosive plasma reaction that diminishes the efficiency of the invention. The heat losses are caused by a substantial under-using of the high temperature plasma heat, which in turn requires more consumption of energy from the energizing means to further continue the plasma reaction. As presently known to applicants, the apparatus and method are not noticeably usable in practice.

A second opportunity suggested by the aforesaid patent is that making the concentration of hydrogen in its mixture with air less than about 30% might lead to complete combustion during the explosion reaction. This way is not explored in the Sutekiyo's patent, possibly to avoid storage of hydrogen for the engine. The Sutekiyo's patent was filed in 1984, at which time the knowledge about special gas adsorbing materials for compressed gas containers, according to a U.S. Pat. No. 4,619,225 to Lowther issued in 1986 (discussed herein below), was not available. Therefore, Sutekiyo dealt with only the pure hydrogen-oxygen reactions wherein both reactants were obtained from water.

A U.S. patent application Ser. No. 11/374,779, hereby entirely incorporated by reference, filed by Yuriy Yatsenko on Mar. 14, 2006, discloses an apparatus, including an internal combustion engine. For powering the engine, the apparatus has a fuel (mainly hydrogen) storage means and also produces hydrogen fuel from water. It comprises water supply means; controlling means; a collector, receiving combustion products output from engine's operation; a transformer, utilizing thermo-impact of the combustion exhaust products and dissociating supplied water into ionized hydrogen and oxygen; an ion divider electrically separating hydrogen and oxygen ions; exhaust means outputting exhaust products from the collector into the atmosphere, on their way out heating water in the water supply means. The fuel storage means initially contains liquid hydrogen or another predetermined fuel. Electrolyzer means are provided to supplement hydrogen and oxygen ions production.

The aforesaid invention utilizes a principally different way for obtaining hydrogen and oxygen from a water body using the heat of the combustion exhaust directly for dissociation and ionization of the water body. Namely: during the combustion process, within about 5 minutes, the exhaust products reach a temperature substantially in the range from 800.degree. C. to 1000.degree. C., and are expanded into the collector. Molecules of the water body contained in the transformer are subjected to a thermo-impact or thermo-impulse and an essential portion of those molecules momentarily dissociate eventually into positively charged hydrogen ions and negatively charged oxygen ions. It is known, that Lavoisier, a famous French physicist, observed such process in his experiments with pouring water onto an incandesced iron rod (made white-hot), and he was able to register hydrogen and oxygen as output products of the reaction.

The aforesaid invention implements a separation of the ionized hydrogen and oxygen gases within the ion divider, essentially shaped as a V-like tubular chamber. The divider has a knee-like junction in its bottom region joining its two tubular portions: a left and a right portion. The left tubular divider portion within its top region has, for example, a hydrogen outlet, and the right tubular divider portion within its top region respectively has an oxygen outlet.

Each tubular portion of the divider contains a coil disposed along the inner sidewall of the portion, with a lower end of the coil positioned in the bottom region of the divider, and a top end of the coil positioned in the top region of the portion. The top end of each coil is electrically connected to a respective pole of a DC source (e.g. the top of the left coil is connected to the plus-pole, and the top of the right coil is connected to the minus-pole). This allows collecting hydrogen positive ions in the top region of one tubular portion, and the oxygen negative ions correspondingly in the top region of the other tubular portion. The resultant hydrogen gas is further pumped into a hydrogen tank, wherein it's stored in a compressed state, and controllably fed into cylinders of the internal combustion engine. The resultant oxygen gas is directed either into the atmosphere (for car embodiments), or into the collector to chemically react with the exhaust products within the collector, and to raise the temperature inside the collector (for truck embodiments).

The invention disclosed in the U.S. patent application Ser. No. 11/374,779 has an advantage of utilizing the high temperature of combustion exhaust for further producing the hydrogen gas from water through said thermo-impact effect, thereby partially replenishing the consumed amount of hydrogen from the tank.

On the other hand, it is now believed that using the combustion reaction of hydrogen with air oxygen in the traditional way, described in the patent application Ser. No. 11/374,779, decreases the efficiency of that invention. The produced oxygen is not used for the combustion reaction in the engine cylinders that is simply wasted in the car embodiments, or used for the aforementioned supplemental purpose in the truck embodiment. Instead, the produced hydrogen reacts with the oxygen of air freely incoming into the cylinders in a random ratio with the incoming hydrogen, which is not highly efficient for the reaction (see the above mentioned U.S. Pat. No. 4,625,681). As a result, the level of power produced by the engine of that invention is essentially lower than its potential maximum.

BRIEF SUMMARY OF THE INVENTION

While the structural arrangements of the above described and many other devices, at first appearance, have similarities with the present invention, they differ in material respects that will become apparent from the following discussion. These differences are essential for the carrying out and using the present invention.

It is therefore an aim of the invention to provide novel and efficient methods for obtaining most possible motion power from the hydrogen-oxygen reactions, and for eliminating or substantial reducing exhaust of pollutants into the atmosphere.

Another aim is to provide novel and useful apparatuses-hydrogen-oxygen plasma engines (HOPE) utilizing the aforesaid methods.

Another aim of the invention is to provide means for initialization and maintaining of the HOPE operation in different combinations of oxygen and hydrogen supply systems.

Another aim of the invention is to use ionized hydrogen and oxygen produced from water in the HOPE for furthering said reactions to significantly raise the efficiency of conversion of the reactions heat into mechanical work.

Other aims of the invention might become apparent to a person skilled in the art from a consideration of the drawings, ensuing description, and claims as hereinafter related.

The present description discloses various embodiments of inventive hydrogen-oxygen and hydrogen-air engines that are usable in automotive, power-producing, chemical and other industries. The engines comprise cylinders; water dissociation means, including thermo-impact transformers and possibly electrolyzers; ionic dividers separating hydrogen and oxygen ions; injection means configured to inject hydrogen and oxygen/air doses in response to an operator's action and according to inventive dosing methods taking into account a hydrogen-oxygen optimal ratio suitable for an explosive plasma reaction in the cylinders, increasing engines torque, eliminating/reducing pollutions.

Determination of optimal ratios for hydrogen-air mixtures is also discussed herein. The dosing methods include algorithms for computing termination injection pressures for hydrogen-oxygen/air doses. Different hydrogen-oxygen/air delivery system are described in conjunction with modified dosing methods. The delivery systems are exemplarily connected to hydrogen and oxygen tanks, or to a hydrogen tank and a compressed-air container variously communicating with the ionic dividers, including means for oxygen enrichment of the air doses.

BRIEF DESCRIPTION OF THE DRAWINGS

The same reference numerals are in general referred to the same or similar units or parts on different drawings. Newly introduced elements are denoted in the description by reference numerals enclosed in parentheses.

PREFERRED EMBODIMENTS OF THE PRESENT INVENTION

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

One of the major novel features of the present invention, distinctive from the above mentioned U.S. Pat. No. 4,625,681, is that the present invention utilizes said thermo-impact as a different way for dissociation of water into hydrogen and oxygen ions for conducting said explosive plasma reaction to produce a substantially new result (more efficiently obtain motion power or torque), while using essentially different structural means.

Another major novel feature of the present invention, distinctive from the referenced above U.S. patent application Ser. No. 11/374,779, is that the present invention creates conditions for carrying out the explosive combustion reaction versus the traditional combustion reaction of hydrogen with oxygen to produce a substantially new result (i.e. to obtain more motion power or torque), while using essentially different apparatus structures and dosing methods.

The different structural means and dosing methods constitute a substantial part of the inventive method and the inventive hydrogen-oxygen plasma engine (HOPE).

HOPE Common Elements: Ionic Divider, Cylinder, and Injection Chambers

Figure 1:
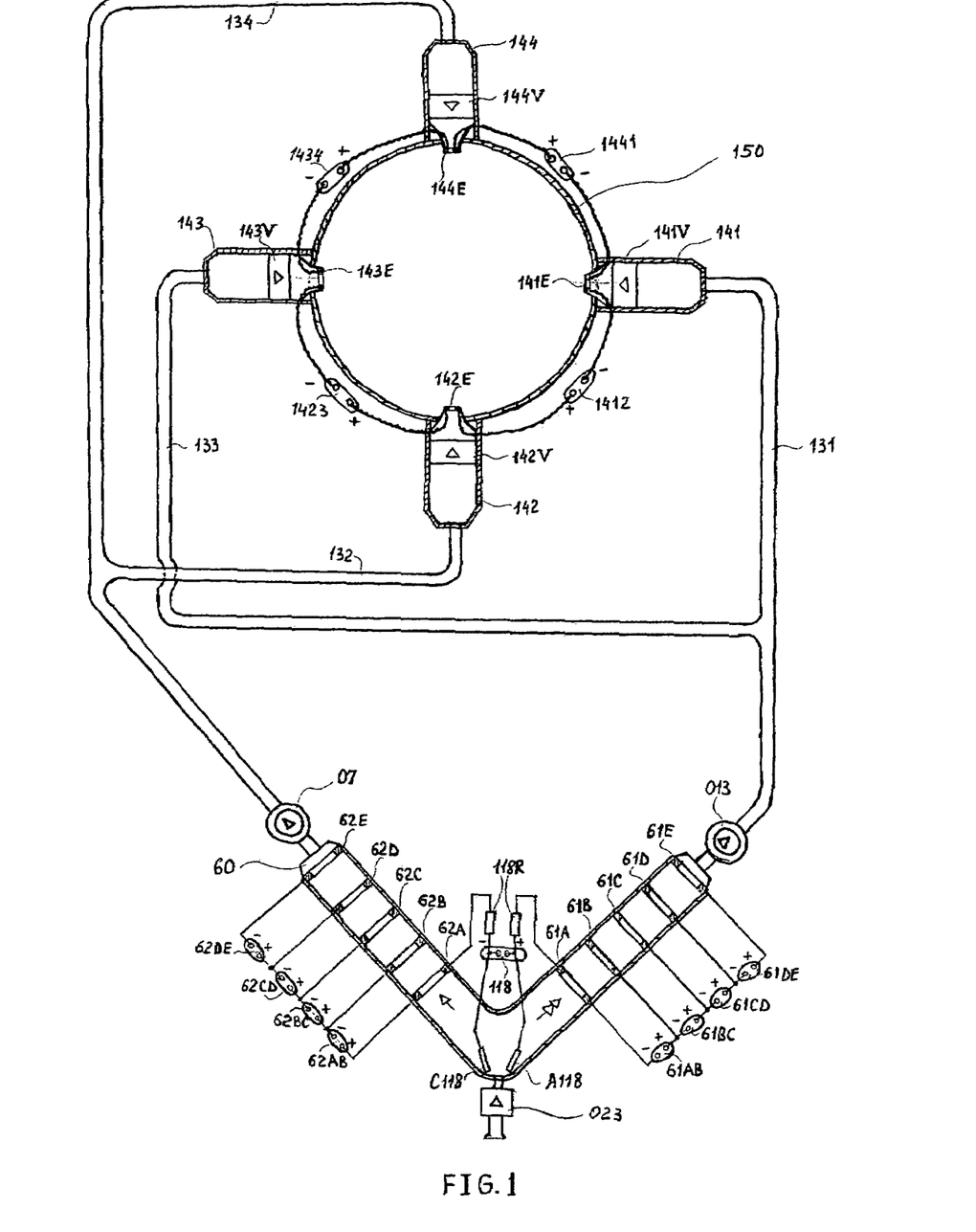
FIG. 1 illustrates a schematic view of several HOPE's units, according to an embodiment of the present invention, for demonstration its principles of operation.

Referring to the drawing on FIG. 1, there is schematically partially shown an embodiment of HOPE, comprising several units and elements.

FIG. 1 particularly illustrates a first unit that is an ionic divider (60), essentially shaped as a V-like tubular chamber made of a suitable dielectric material. Divider 60 has a knee-like junction in its bottom region joining its two tubular portions: a left and a right portion. An inlet valve (023) is mounted below divider 60 and connected to the knee-like junction by a pipe. The HOPE includes a control system, not shown herein.

In this embodiment of HOPE, divider 60 comprises a number of electro-conductive rings, which are mounted substantially parallel, coupled to the inner walls of each tubular portion, so that the left tubular portion contains rings (62A), (62B), (62C), (62D), and (62E)—collectively: rings (62); and the right tubular portion contains rings (61A), (61B), (61C), (61D), and (61E)—collectively: rings (61).

Each pair of rings is connected to a voltage terminal as follows: rings 61A and 61B—to terminal (61AB), 61B and 61C—to terminal (61BC), 61C and 61D—to terminal (61CD), 61D and 61E—to terminal (61DE); rings 62A and 62B—to terminal (62AB), 62B and 62C—to terminal (62BC), 62C and 62D—to terminal (62CD), 62D and 62E—to terminal (62DE). FIG. 1 shows the polarities of the terminals.

FIG. 1 depicts the left tubular portion, which in its top region is connected to a hydrogen pump (07), having connected to pipes (132), and (134), made of suitable materials. The right tubular portion is connected to an oxygen pump (013), which is in turn connected to pipes (131), and (133).

Other embodiments (instead of pumps 07 and 013, or in addition to) may utilize electromotive pumping means (not shown), e.g. by arranging elements similar to rings 61 and 62, electrically connected to terminals, similar to the above described, along pipes 131, 132, 133, and 134. This chain of the elements would end within the injection chambers. Some other embodiments of HOPE may have differently shaped divider 60, or use different electrically or magnetically dividing means suitable to provide separation of ions.

Most embodiments of the HOPE comprise an electrolyzer anode (A118) and an electrolyzer cathode (C118), disposed in the knee-like junction of divider 60, and connected to a terminal (118), which supplies a predetermined voltage to the anode and cathode. The electrolyzer contributes into ions production from gaseous water (steam) input into divider 60 through valve 023 collectively with the input hydrogen and oxygen ions.

Dividers 60 may be situated in any suitable location. The HOPE may comprise one (or another suitable number) such common divider for all cylinders, or each HOPE cylinder may have its "own" divider.

The embodiment of HOPE comprises other units depicted on FIG. 1: a cylinder (150), conditionally shown in the horizontal position for illustrative purposes. Cylinder 150 has a cylinder head (not shown on FIG. 1).

The embodiment of HOPE comprises a number (in this embodiment—four) of injection chambers (141), (142), (143), and (144), mounted on the head of cylinder 150. In this embodiment, chambers 141, 142, 143, and 144 are shown identical, having a substantially cylindrical shape with a rear end for connection to one of said pipes: chamber 141 to pipe 131; chamber 142 to pipe 132; chamber 143 to pipe 133; chamber 144 to pipe 134.

In this embodiment, a front end of each of chambers 141, 142, 143, and 144 are furnished with electronically regulated internal valves (141V), (142V) (143V), (144V). The internal valves have portions outstanding into the inner space of the head of cylinder 150. These outstanding portions of chambers 141, 142, 143, and 144 each is furnished with an electrode, correspondingly: (141E), (142 E), (143 E), and (144 E).

Electrodes 141E, 142E, 143E, and 144E are electrically connected to terminals (1412), (1423), (1434), and (1441) in the following order: a pair of 141E and 142E to terminal 1412; 142E and 143E to terminal 1423; 143E and 144E to terminal 1434; 144R and 141E to terminal 1441.

When a mixture of hydrogen and oxygen ions and water molecules enters divider 60 through valve 023, the ions (including those dissociated from the steam in divider 60 by the electrolyzer) will follow the polarities of voltage on rings 61 and 62. Thus, the oxygen ions will be collected in the top region of the right tubular portion; and the hydrogen ions will be collected in the top region of the left tubular portion. Pump 07 will pump hydrogen ions through pipes 132 and 134 into injection chambers 142 and 144. Pump 013 will pump hydrogen ions through pipes 131 and 133 to injection chambers 141 and 143.

An example of operation of said elements follows. Let's suppose that a mixture of hydrogen and oxygen ions, input via valve 023 into divider 60, is produced from dissociation of a water body. The pressure of hydrogen and oxygen gases in the injection chambers will therefore have predetermined values. At a certain moment, a control system (not shown herein) opens valves 141V, 142V, 143V, 144V and substantially at the same time applies high voltage pulses of a predetermined value to terminals 1412, 1423, 1434, and 1441 in the polarities indicated on FIG. 1. A ratio between the total hydrogen and total oxygen masses should be about 1/8, since they were dissociated from the water body. Hence, an explosive hydrogen-oxygen combustion reaction will take place in cylinder 150.

In other embodiments, different ways of injection may be deployed in the injection chambers. One of such ways may be the use of a high voltage electric field expelling ions from the injection chambers (not illustrated herein). Such a device may include an anode inside a first injection chamber (for hydrogen ions) and a cathode inside a second injection chamber (for oxygen ions). The inlet openings into the cylinder may be furnished with net electrodes controlling the entrance of ions into the cylinder. Initially, the net electrode in front of the anode (cathode) may have a positive (respectively negative) potential relative to the anode's (cathode's) potential, preventing the entrance of hydrogen (oxygen) ions into the cylinder. The control system may substantially simultaneously apply a zero potential to the net electrodes and a high voltage pulse potential difference between the anode and the cathode, thereby pushing the ions out from the injection chambers into the cylinder, and initiating an explosion plasma reaction.

Figure 2:
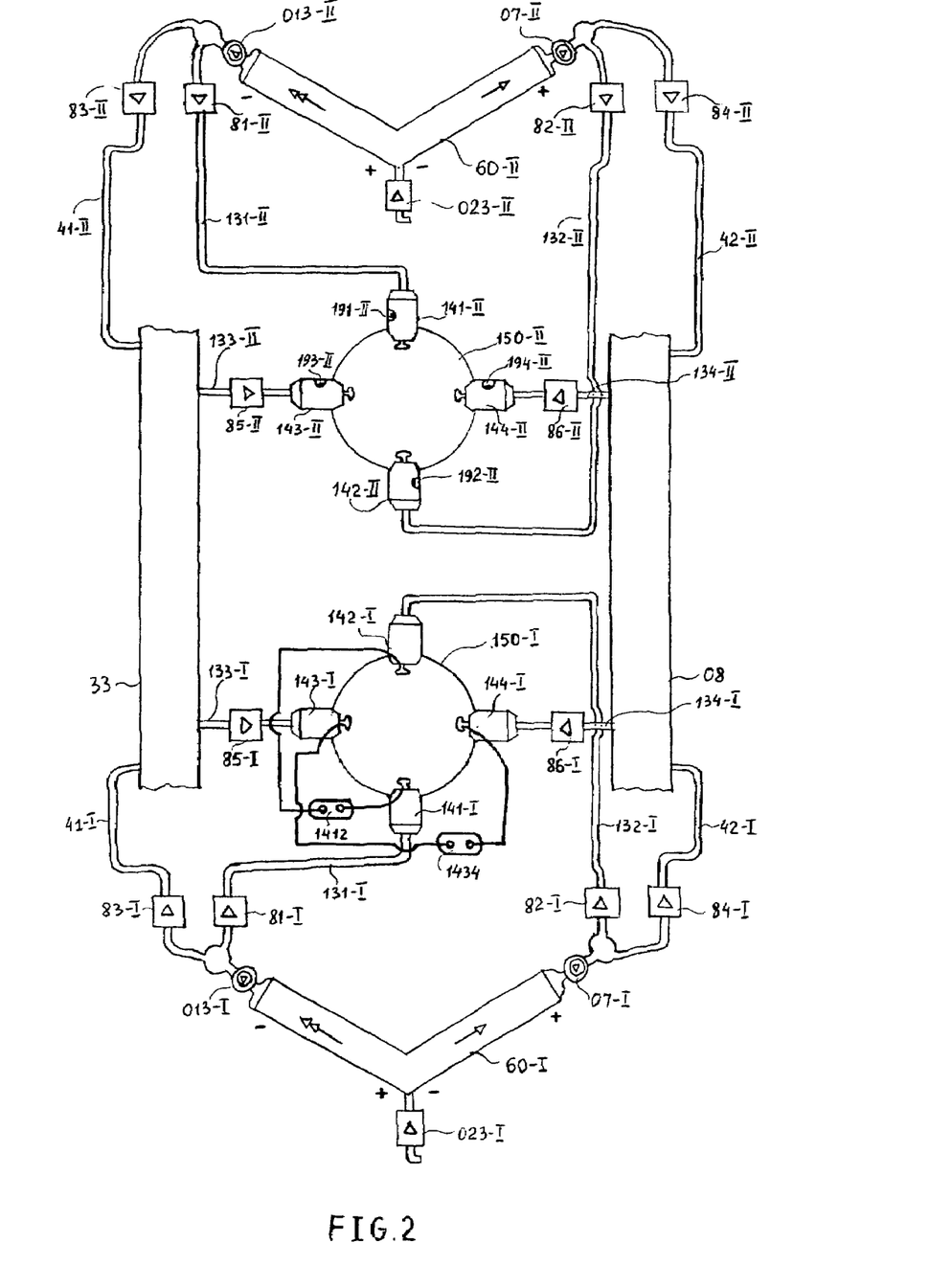
FIG. 2 illustrates a schematic view of a parallel gases delivery system for the HOPE used in combination with hydrogen and oxygen tanks, according to an embodiment of the present invention.

Parallel Gases Delivery Systems for Hope Chambers Implemented with Hydrogen and Oxygen Tanks FIG. 2 schematically illustrates an embodiment of HOPE implemented in combination with a hydrogen tank (08), and an oxygen tank (33). The tanks in this embodiment are charged respectively by compressed hydrogen and oxygen prior to operation of the HOPE, e.g. on a special station.

Generally, the tanks may be substituted by special devices capable to compress gases, or to store liquefied gases, or also by devices containing substances or combinations of substances from which hydrogen or oxygen gases may be derived. In particular, the aforementioned U.S. Pat. No. 4,619,225, hereby entirely incorporated by reference, describes "a gas adsorbing material", which "fills the containing vessel and, thereby, limits the maximum rate at which gas can leave the vessel". At the end of the description of that patent, there is a list of such kind materials, though other similar materials having these properties may be utilized as well. The use of tanks furnished with such adsorbing material greatly reduces the hazards of use of containers with compressed gases. Such tanks found broad use in many industries, including hydrogen and oxygen tanks utilized for automobiles in some new fuel cell technologies.

The embodiment comprises a number of (only two are shown of FIG. 2) internal cylinders (150-I) and (150-II) having cylinder heads. Each cylinder has its individual divider (60-I) and (60-II). Other embodiments may have a different scheme that is one divider may be shared by a number of cylinders (common divider) or otherwise.

The embodiment comprises a number of (only four are shown of FIG. 2) injection chambers suitably mounted on the head of each internal cylinder. FIG. 2 depicts chambers (141-I), (142-I), (143-I), and (144-I) installed on cylinder 150-I, and chambers (141-II), (142-II), (143-II), and (144-II) installed on cylinder 150-II.

The embodiment comprises a number (only two are shown) of hydrogen pumps (07-I) and (07-II) and oxygen pumps (013-I) and (013-II) connected to tubular portions of dividers 60-I and 60-II. Control valves (81-I), (83-I) communicate with pump 013-I, and control valves (82-I), (84-I) communicate with pump 07-I. Control valves (81-II), (83-II) communicate with pump 013-II, and control valves (82-II), (84-II) communicate with pump 07-II.

Valves 84-I and 84-II are connected to hydrogen tank 08 via pipes (42-I) and (42-II). Valves 83-I and 83-II are connected to hydrogen tank 08 via pipes (41-I) and (41-II). Chambers 141-I, 142-II, 143-II, and 144-II communicate with valves 81-I, (85-I), 82-I, and (86-I); chambers 141-II, 142-II, 143-II, and 144-II communicate with valves 81-II, (85-II), 82-II, and (86-II). Valves 85-I and 85-II are connected to oxygen tank 33; valves 86-I and 86-II are connected to hydrogen tank 08.

High voltage electrodes of chambers 141-I and 142-I (similar to 141E and 142E, depicted on FIG. 1) are disposed on the opposite sides of cylinder 150-II (illustrated along the vertical axis of the drawing on FIG. 2), and the electrodes are connected to a terminal (1412). Analogously, high voltage electrodes of chambers 143-I and 144-I shown on FIG. 2 (similar to 143E and 144E depicted on FIG. 1) are disposed on the opposite sides of cylinder 150-II (illustrated along the horizontal axis of the drawing on FIG. 2), and the electrodes are connected to a terminal (1434). High voltage electrodes (not shown) of chambers 141-II, 142-II, 143-II, and 144-II are similarly connected to respective high voltage terminals (not shown herein).

The aforementioned elements in their combination may be defined as a parallel hydrogen-oxygen delivery system. This system may be slightly modified by eliminating pipes 41 (I and II) and 42 (I and II), and valves 83 (I and II) and 84 (I and II), making a "pure" parallel system, which may also be usable in some HOPE embodiments. Intermediate hydrogen and oxygen vessels may be arranged for temporary storage of ionized gases, conveniently located, for instance between valve 82-I and chamber 142-I, and between valve 81-I and chamber 141-I. The parallel systems allow initiating the explosion plasma reaction in cylinders 150-I and 150-II by inletting hydrogen via valves 86-I and 86-II into chambers 144-I and 144-II, and, on the other hand, by inletting oxygen via valves 85-I and 85-II into chambers 143-I and 143-II, wherein the gases are generally injected into the cylinders with applying of high voltage pulses to terminals 1434. In some cases (basically after the initialization), the explosion reaction in the cylinders may occur without such high voltage pulses, especially when a ratio of mass units of hydrogen and oxygen, participating in the reaction, is about 1/8 that is discussed below.

An Optimal Ratio for Hydrogen and Oxygen Pressures and HOPE Operation

Considering gaseous hydrogen and oxygen as ideal gases, according to the kinetic gas theory, an optimal ratio of the hydrogen-oxygen pressure values in the injection chambers is believed to be approximately 1/8, that is the hydrogen pressure should be about eight times less than the oxygen pressure (for an equal volume pair of hydrogen and oxygen containing vessels), since 2 atoms of hydrogen (atomic weight is 1) react with 1 atom of oxygen (atomic weight is 16). For ideal gas confined in a vessel, its density is proportional to its pressure, thus the ratio of pressure values for equal volumes of the hydrogen and oxygen vessels should be the same as the mass ratio: hydrogen=1, oxygen=8. This optimal ratio of pressure allows achieving the required reagents quantities to obtain a maximally effective explosion plasma reaction. The optimal ratio can be re-calculated according to the well known equation of Van der Waals modified for real gases, but should not produce a significant difference in the temperature ranges used herein. A skilled artisan should be able to complete this recalculation for any given proportion of volumes of chambers, for example, 143-I and 144-I chosen for a particular design of the HOPE.

Thusly, the control system will need to monitor and maintain a balance of the optimal pressure ratio in chambers 143-I (143-II) and 144-I (144-II) by regulating gases flows via valves 85-I (85-II) and 86-I (86-II). In contrast, chambers 141-I (141-II) and 142-I (142-II) receive ions from dividers 60-I (60-II) via valves 81-I (81-II) and 82-I (82-II), which ions are resulted from separation of dissociated water in the dividers, so that their ratio essentially should be 1/8.

The HOPE operation will depend on real conditions of its use. If, for instance, the HOPE embodiment is utilized for propelling a car, the gas pedal positioning by the driver will be translated into the opening of valves 82-I (82-II) and 81-I (81-II) supplying more hydrogen into chambers 142-I (142-II) and consequently more oxygen into chambers 141-I (141-II). This will intensify the explosion reaction and produce more mechanical power by the HOPE, propelling the car. If the driver further accelerates the car, valves 86-I (86-II) will be open, and chambers 144-I (144-II) will start operating adding more hydrogen into the cylinders. The control system will then open valves 85-I (85-II) and inlet oxygen to chambers 143-II (143-II) according to said ratio, thereby further intensifying the plasma reaction and increasing the torque of HOPE.

Oppositely, if the car is decelerated, valves 82-I (82-II) and 81-I (81-II) are shut by the control system, but valves 83-I (83-II) and 84-I (84-II) will be open, and the pumps will pump oxygen and hydrogen gases into tanks 33 and 08. In some embodiments of HOPE, e.g. utilized for vehicles, a recuperating deceleration can be used, that is the braking is actuated by an electro-generator. The generator's current can feed the electrolyzer of divider 60 (and, if necessary may additionally heat up a transformer 05 shown on FIG. 3, e.g. using a usual electrical heater or an electromagnetic induction device) to produce more ions that will be accumulated in tanks 08 and 33. This measure will further raise the efficiency of the HOPE.

A method of maintaining the optimal ratio (or a dosing algorithm) is discussed herein further. The explosion reaction continues necessary producing aforesaid thermo-impact, generating hydrogen and oxygen ions in the transformer (not shown on FIG. 2), which ions then are supplied into dividers 60-I and 60-II for separation. Once a predetermined quantity of ions is produced in dividers 60-I and 60-II, they are pumped by pumps 07-I and 013-I, and pumps 07-II and 013-II into chambers 142-I and 141-I (for cylinder 150-I) and into 142-II and 141-II (for cylinder 150-II), wherein the ions are injected into the cylinders.

An Exemplary HOPE Embodiment with a Two-Stroke Cycle

Figure 3:
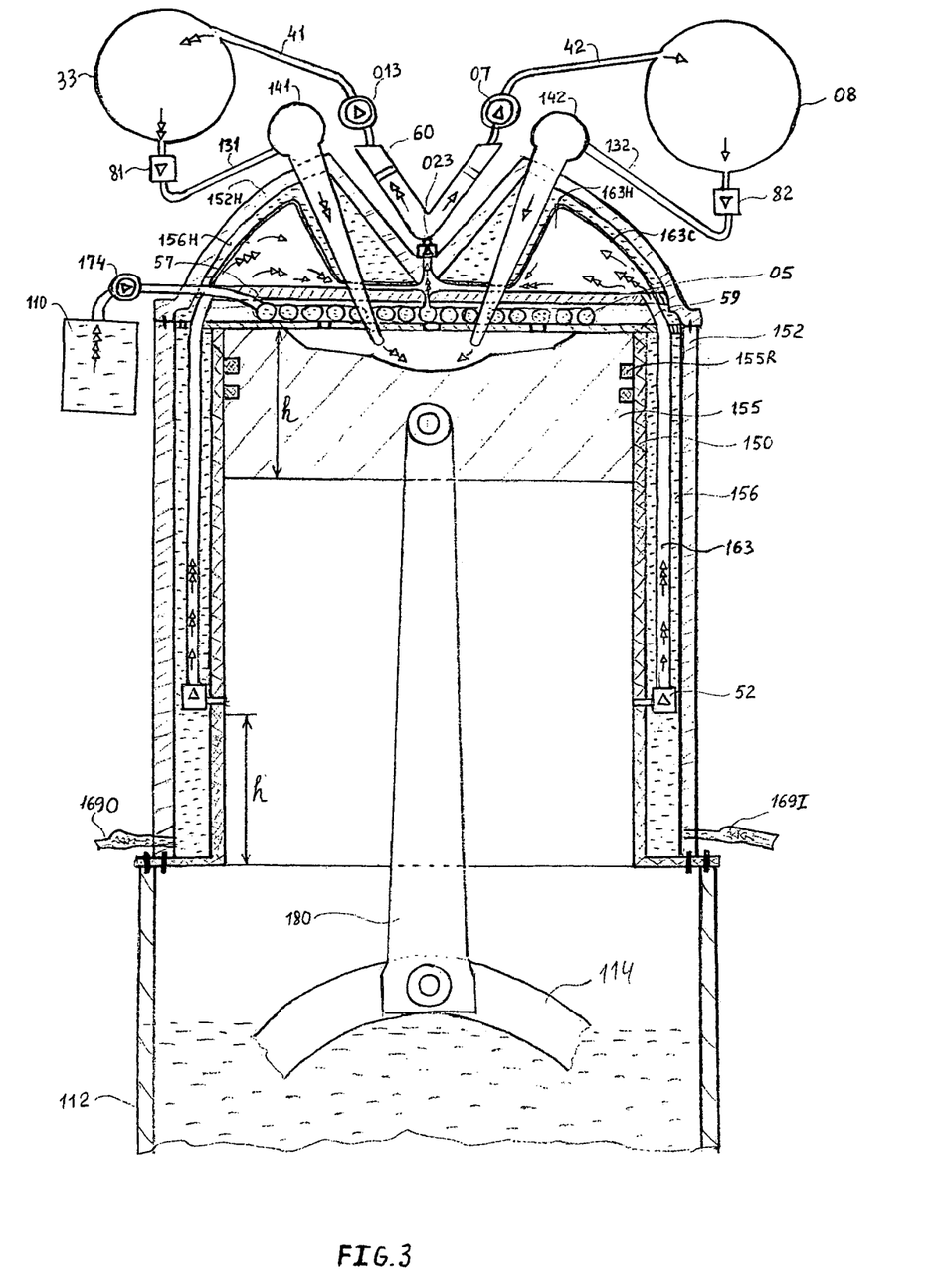
FIG. 3 illustrates a schematic view of a two-stroke HOPE used in combination with hydrogen and oxygen tanks and a sequential gases delivery system, according to an embodiment of the present invention.

FIG. 3 represents a HOPE embodiment with an engine unit deploying a two-stroke cycle. The HOPE embodiment comprises the engine unit including an external cylinder (152) (that is part of a traditionally constructed engine's block in most embodiments), with an upper opening and a bottom opening, and an external cylinder head cover (152H) capable to properly close the upper opening of cylinder 152. Cylinder head cover 152H has a shape of a semi-sphere with a conical concavity in the center of the semi-sphere surface. The engine unit includes an internal cylinder (150), preferably made of a suitable type of ceramic. Cylinder 150 has an upper opening, and a bottom opening coupled with an outward base ring at the circumference of the bottom opening, which base ring having an outer diameter greater than the diameter of cylinder 152. The bottom opening of cylinder 152 is attached to the base ring of cylinder 150. A space between the sidewalls of cylinders 150 and 152 is referenced as (156) on FIG. 3. The upper openings of cylinder 150 and 152 are closed by a lower disc (59), having predetermined holes, and preferably made of a suitable titanic alloy.

The HOPE embodiment comprises an ionic transformer (05) performed from a pipe of a suitable material, which pipe shaped as a plane spiral having a first open peripheral end, and a second open central end substantially situated above the center of disc 59. Other embodiments may employ a differently shaped transformer.

The first end of transformer 05 communicates via a pipe with an outlet of a water pump (174) disposed outside cylinder 152. An inlet of pump 174 is connected to a water tank (110), supplying water of a predetermined quality (possible distillate water) into transformer 05, wherein the water is dissociated into hydrogen and oxygen ions resulted from aforesaid thermo-impact.

The engine unit includes a disc (57) of a suitable material, disposed above transformer 05, which disc 57 having a central hole coincided with and connected to the second central end of transformer 05.

The engine unit includes an upper cover (163C) of an appropriate material, mounted above disc 57. Cover 163C has a shape of a cupola with a truncated cone-like concave insertion in the cupola's center open upward, so that there is a space between the bottom of the insertion and disc 57, as depicted on FIG. 3. Cover 163C is coupled with disc 57 along its base circumference. Therefore, cover 163C and disc 57 form an inner space (163H), and cover 163C and cylinder head cover 152H form an inner headspace (156H).

The embodiment of HOPE comprises an ionic divider (60), earlier described herein. Divider 60 is mounted within the aforesaid concavity of head cover 152H. A control valve (023) communicates divider 60 with inner space 163H. A purge valve (not shown) should be arranged to output extra-pressure gases from inner space 163H.

The embodiment of HOPE comprises a hydrogen pump (07) and an oxygen pump (013) are connected to the tops of the respective tubular portions of divider 60. The HOPE embodiment comprises a hydrogen tank (08) and an oxygen tank (33) in general initially charged (possibly on a special station) with the corresponding gases compressed to predetermined pressure values. The tanks are generally furnished with purge (release) valves (not shown on FIG. 3). A pipe (42) connects pump 07 with tank 08; a pipe (41) connects pump 013 with tank 33.

The embodiment of HOPE comprises a number of injection chambers having inner control valves with ending high voltage electrodes connected to corresponding terminals, which chambers, valves, electrodes, and terminals are generally described above in the disclosure. In this embodiment only two equal-sized chambers are shown: a hydrogen chamber (142) and an oxygen chamber (141). Chambers 141 and 142 are mounted above cylinder head cover 152H, having conical injection sections disposed so that crossing the upper walls of head 152, cover 163C, disc 57, a space between corresponding turns of the spiral pipe of transformer 05, disc 59, and the lower ends of chambers 141 and 142. The conical sections end in the top region of the inner space of internal cylinder 150. Chambers 141 and 142 include pressure measuring means or sensors (not illustrated). Different shapes, size proportions, and number of the chambers may be implemented for a particular design in other HOPE embodiments.

Tank 08 through a control valve (82) and a pipe (132) is connected to chamber 142; and tank 33 through a control valve (81) and a pipe (131) is connected to chamber 141. This type of connection between the injection chambers and the hydrogen and oxygen tanks may be defined as a sequential gases delivery system versus the parallel delivery system described in the previous embodiment. Other embodiments of the two-stroke HOPE may utilize the parallel delivery system or combinations of both systems.

The engine unit includes a piston (155), disposed and capable of vertical displacement within cylinder 150, having a highest and a lowest positions. Piston 155 is generally made of a suitable metallic alloy. Piston 155 includes ceramic rings (155R) on its sidewalls, so that rings 155R are snag-fitting within the inner walls of internal cylinder 150, also preferably made of ceramic of a suitable type. Piston 155 is attached to a rod (180) further connected to a motion-translating mechanism (that is not subject of the present invention), a part of which is referenced as (114) on FIG. 3. In the embodiment, this mechanism is generally placed into a casing 112 filled with a liquid for lubrication. This embodiment uses water as such liquid. The use of traditional lubrication oil is not recommended within installations utilizing compressed oxygen unless special anti-fire measures are taken.

Piston 155 of this embodiment has a solid cylindrical shape, except having a concavity in the center of its upper base, which concavity is symmetrical relative to the center vertical axis of piston 155. Piston 155 has a predetermined height (h), as depicted on FIG. 3. The concavity of piston 155 has a predetermined volume, might be made by a milling cutter, and is so formed that the lower ends of the conical injection sections of chambers 141, 142, when assembled, are located within the concavity in the highest position of piston 155. FIG. 3 illustrates the concavity consisting of an outer portion shaped as a truncated cone with an angle to the horizon, so that the cone is narrowing downwardly; an intermediate portion similarly shaped but with a lesser angle to the horizon, and an inner portion shaped as a spherical segment in the center of concavity.

Cylinder 150 has a number of openings in its sidewalls, connected to first ends of exhaust control valves (52), disposed between the sidewalls of cylinders 150 and 152. Control valves 52 are connected by their second ends with a pipe (163) communicating to inner space 163H in the region of the plane, crossing disc 57. The sidewall openings of cylinder 150 are positioned slightly higher than the height (h) above the bottom opening of cylinder 150 (see FIG. 3), so that the top surface of piston 155, being in the lowest position, is lower than the sidewall openings.

The aforesaid space 156 between the sidewalls of cylinders 150 and 152, and inner headspace 156H communicate through channels (not referenced on FIG. 3) crossing discs 57, 59, and the space therebetween.

The HOPE embodiment comprises a cooling subsystem including a suitable cooling liquid. The cooling liquid particularly fills space 156 and headspace 156H. In this embodiment water is used as the cooling liquid. The cooling water may be pumped in by a pump (not shown), entering space 156 through an inlet (1691) and exiting space 156 through an outlet (1690).

Operation of the Two-Stroke HOPE Embodiment and a Dosing Method

In the initial stage, when the HOPE starts, the control system opens valves 81 and 82 (FIG. 3), and inlets compressed hydrogen from tank 08 into chamber 142. A starter (not shown) revolves the motion-translating mechanism, moving piston 155 from the lowest position upward (a first stroke). The control system opens the internal valve of chamber 142 having a first hydrogen pressure and injects a dose of hydrogen into cylinder 150. Piston 155, while moving upward, compresses the hydrogen in cylinder 150. When the piston reaches a predetermined mark slightly below (about a few millimeters) its highest position, the control system opens the internal valve of chamber 141 having a first oxygen pressure and injects a dose of oxygen into cylinder 150. The positions of piston 155 where the hydrogen and oxygen doses are actuated should be thoroughly determined for each particular embodiment of the HOPE to avoid detonation.

As discussed hereinabove, the mass of oxygen dose should be about 8 times greater than the mass of hydrogen dose injected earlier. This would create the conditions for an effective explosion plasma reaction. Thus, the control system should be provided with a dosing method or a dosing algorithm for computing of a hydrogen and an oxygen doses. Such a dosing method follows.

Suppose we might consider the compressed hydrogen and oxygen as ideal gases, i.e. their density is proportional to their pressure (the proportional coefficients are conventionally known). The sensor means (part of the control system, not shown) measure the pressure in chambers 142 and 141. Suppose, chamber 142 has a first hydrogen pressure (Ph1) before the injection of hydrogen, a second hydrogen pressure during the injection (Ph2) and a triggering hydrogen pressure (Ph2T) terminating the injection, which can be determined based on an operator's command. The oxygen dose to be injected is 8 times greater. If chamber 141 has a first oxygen pressure (Po1) prior to injection, and the oxygen dose is already computed, then a CPU of the control system may compute a triggering oxygen pressure (Po2T), which will have to terminate the injection of the oxygen dose.

Therefore, when a second oxygen pressure (Po2) in chamber 141 measured during the injection will reach the triggering oxygen pressure Po2T, the internal valve of chamber 141 will have to be shut off. Thusly, the following should be true: (Po1−Po2T)=8*(Ph1−Ph2T) for equally sized hydrogen and oxygen chambers. Generally, for an optimal ratio Or, a volume of an oxygen vessel Vo, and a volume of a hydrogen vessel Vh, it should be: (Po1−Po2T)*Vo=Or*(Ph1−Ph2T)*Vh. Hence, the triggering oxygen pressure is: Po2T=Po1−Or*(Ph1−Ph2T)*Vh/Vo (Formula I).

The entire dosing algorithm may comprise the following set of instructions for execution by the controlling means: memorize an optimal ratio substantially equal one eighth; memorize a volume of said hydrogen vessel; memorize a volume of said oxygen vessel; measure the first hydrogen pressure; measure the first oxygen pressure; get an external command for a required hydrogen dose; translate the command into a hydrogen triggering pressure; calculate a hydrogen difference between the first hydrogen pressure and the hydrogen triggering pressure, multiply the hydrogen difference by the optimal value, multiply by said hydrogen vessel volume, divide by said oxygen vessel volume, memorize the calculation result; calculate an oxygen triggering pressure by subtracting the calculation result from the first oxygen pressure; commence the injection of the hydrogen dose; measure the second hydrogen pressure until reaching the hydrogen triggering pressure; send a signal to terminate the injection of the hydrogen dose; commence the corresponding injection of the oxygen dose; measure the second oxygen pressure until reaching the oxygen triggering pressure; send a signal to terminate the injection of the oxygen dose; and ignite a mixture of the hydrogen and oxygen doses in the cylinders.

Formula I can also be applied to the case when the pressure is measured in the hydrogen and oxygen tanks (with respective Vh and Vo volumes), then the chambers design should enable complete evacuating the chambers after each injection. Different designs of the chambers may be utilized (one of them is discussed further) to allow implementing this dosing method. Ph1 is measured by the control system, and Ph2T is computed based on a command of the operator, e.g. the driver, entering such command through a pedal displacement and further translated by the control system aware of the engine's characteristics.

Other hydrogen-oxygen engines (including rocket jet engines) may utilize Formula I, but should include at least a hydrogen-containing and an oxygen-containing vessel means and at least one hydrogen and one oxygen injection chambers. Other dosing methods may be used for HOPE embodiments (e.g. reactants quantities may be determined otherwise than by pressure measurements), but should substantially provide said 1/8 ratio for the pure hydrogen-oxygen reactants doses with a predetermined accuracy.

Also, in some embodiments the oxygen dose may be started injecting before the hydrogen dose finished injecting, but the hydrogen dose should finish injecting prior to the oxygen dose finishes its injecting and the optimal explosion ratio should be reached at the end of the oxygen injection. Some embodiments for special reasons might implement the oxygen injection first, and the hydrogen injection second, then the dosing method should be modified accordingly, but should not be significantly changed.

In case the above disclosed parallel gas delivery system (depicted on FIG. 2) is chosen for a HOPE embodiment, the dosing method should also be modified. It's believed that it will be beneficial to use first all available hydrogen and oxygen ions dissociated, for instance, in divider 60-I and delivered to chambers 142-I and 141-I respectively. This means that the control system should first measure the pressure values in those chambers and determine a maximum possible hydrogen ions dose (MHID) and a maximum possible oxygen ions dose (MOID) for injection. Once MHID is determined, it's compared with a signal of the operator's command (e.g. a pedal displacement by the driver) translated by the control system into a required hydrogen dose (RHD).

If the RHD=<MHID, then the CPU computes a required oxygen dose (ROD) based on the optimal ratio, measured Ph1 and commanded Ph2T, according to Formula I. Next, if the ROD=<MOID, then the RHD and ROD are injected by chambers 142-I and 141-I (a hydrogen and/or an oxygen ions dose) respectively. If either RHD>MHID or/and ROD>MPOID, a difference (RHD−MHID) and/or (ROD−MOID) should be compensated by chambers 144-I and/or 143-I injecting hydrogen and/or oxygen gases (a "hydrogen atoms dose" and/or an "oxygen atoms dose", though in reality they may contain ions portions delivered to tanks 08 and 33 via valves 84-I and 83-I respectively) flowing from tanks 08 and 33.

Figure 6:
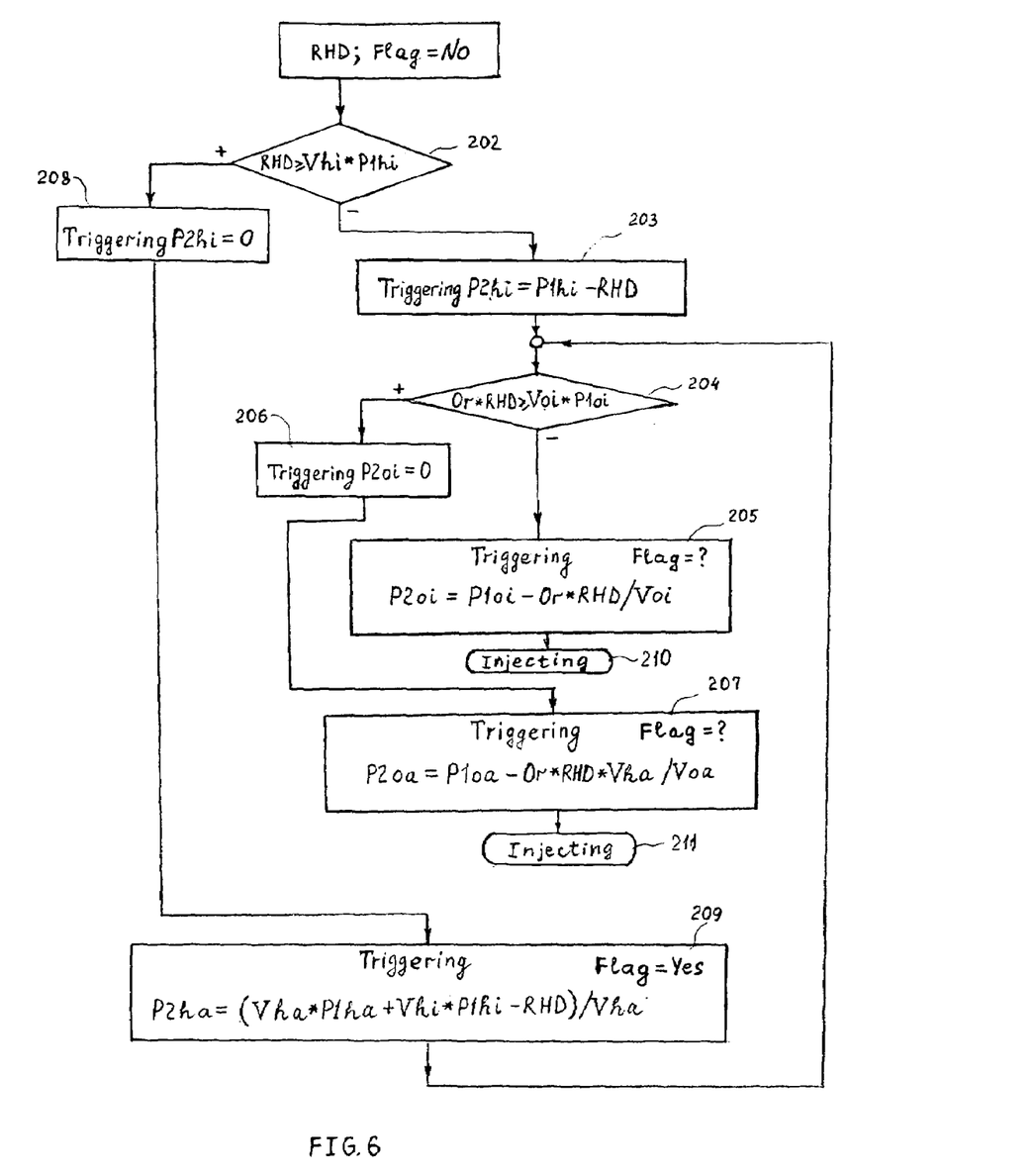
FIG. 6 illustrates a flowchart exemplifying an algorithm for computing triggering pressures of injection chambers of a HOPE depicted on FIG. 2, according to an embodiment of the present invention.

An exemplary dosing algorithm for calculation of triggering hydrogen pressure values P2$hi$ (of a "hydrogen ions body", e.g. in chamber 142), and P2$ha$ (of the hydrogen atoms body, e.g. in chamber 144), and triggering oxygen pressure values P2$oi$ (of an "oxygen ions body", e.g. in chamber 141, though it may also contain hydroxyl group ions from the dividers), P2$oa$ (of the oxygen atoms body, e.g. in chamber 143) is illustrated on FIG. 6. Pressure values prior to injecting are referred as P1$hi$ (of the hydrogen ions body, e.g. in chamber 142) and P1$ha$ (of the hydrogen atoms body, e.g. in chamber 144) for the respective hydrogen injection chambers with volumes Vhi (of the hydrogen ions body, e.g. in chamber 142) and Vha (of the hydrogen atoms body, e.g. in chamber 144), and P1$oi$ (of the oxygen ions body, e.g. in chamber 141) and P1$oa$ (of the oxygen atoms body, e.g. in chamber 143) for the respective oxygen injection chambers with volumes Voi (of the oxygen ions body, e.g. in chamber 141) and Voa (of the oxygen atoms body, e.g. in chamber 143).

FIG. 6 depicts a flowchart of computing blocks: block (201) representing the RHD value, conditional blocks (202) and (204) comparing the RHD with the MHID, and comparing the ROD=Or*RHD with the MOID. Blocks (203), (205), (206), (207), (208), (209) represent formulas for computations of the corresponding triggering pressures P2$hi$, P2$oi$, P2$oi$(0), P2$oa$, P2$hi$(0), P2$ha$. Blocks (210) and (211) represent injection commands. A Boolean variable "Flag" is set to "No" if block (209) has not been called, and is set to "Yes" otherwise.

The dosing algorithm shown on FIG. 6 follows:
a. set computing blocks (201), (202), (203), (204), (205), (206), (207), (208), (209), and (210) in memory and go to instruction (b);
b. memorize an optimal ratio substantially equal one eighth, go to instruction (c);
c. memorize the hydrogen atoms volume, the oxygen atoms volume, the hydrogen ions volume, the oxygen ions volume, go to instruction (d);
d. measure the first hydrogen ions pressure, go to instruction (e);
e. measure the first oxygen ions pressure, go to instruction (f);
f. measure the first hydrogen atoms pressure, go to instruction (g);
g. measure the first oxygen atoms pressure, go to instruction (h);
h get an external command for a hydrogen dose, go to instruction (i);
i. translate the command into a required hydrogen dose and memorize it in (201), set Flag to No, go to instruction (j1);
j1. check condition (202): if the required hydrogen dose is less than the first hydrogen ionic pressure multiplied by the hydrogen ions volume, go to instruction (k1), if it is not less—go to instruction (j3);
k1. compute the triggering pressure for the hydrogen ions dose according to (203), go to instruction (l1);
l1. check condition (204): if the required oxygen dose is less than the first oxygen ionic pressure multiplied by the hydrogen ions volume, go to instruction (m1), if it is not less go to instruction (k2);
m1. compute the triggering pressure for the oxygen ions dose according to (205), go to instruction (n1);
n1. if Flag=No commence injecting the hydrogen and oxygen ions doses, if Flag=Yes commence injecting the hydrogen and oxygen ions doses and the hydrogen atoms dose, according to (210), return to instruction (d);
k2. set the triggering pressure for the oxygen ions dose to zero, according to (206), go to instruction (l2);
l2. compute the triggering pressure for the oxygen atoms dose according to (207), go to instruction (m2);
m2. if Flag=No commence injecting the hydrogen and oxygen ions doses and the oxygen atoms dose, if Flag=Yes commence injecting the hydrogen and oxygen ions doses and the hydrogen and oxygen atoms doses, according to (211), return to instruction (d);
j3. set the triggering pressure for the hydrogen ions dose to zero according to (208), go to instruction (k3);
k3. compute the triggering pressure for the hydrogen atoms dose according to (209), set Flag to Yes, go to instruction (l1).

A person skilled in the computer programming art should routinely write a corresponding computer program in a suitable programming language.

Therefore, balancing the ratio in aforesaid way, the control system provides conditions to commence the explosion plasma reaction between the gases in the cylinder of HOPE from the start of the HOPE. The explosion pushes down piston 155 (a second stroke), until it reaches the bottom of internal cylinder 150. The reaction products (a mixture substantially of hydrogen, oxygen, and hydroxyl ions and steam), accumulated above piston 155, are output via valves 52, space 163H, valve 023 into divider 60. On their way, they heat up space 163H, disc 57, and transformer 05. The plasma generated during the explosion reaction in cylinder 150 also heats up transformer 05 situated above the holes of lower disc 59.

In order to obtain hydrogen and oxygen ions through aforementioned thermo-impact, transformer 05 should be heated up within a temperature range from 800.degree. C. to 1000.degree. C. When such temperature is achieved, a substantial portion of the water body in transformer 05 dissociates into ions due to the thermo-impact, which ions are output from the second open central end of transformer 05 into space 163C, and via valve 023 travel into divider 60. As discussed above, the ions are separated in the divider, and are output by pumps 07 and 013 into tanks 08 and 33 correspondingly refilling them.

Therefore, in this embodiment, the water body from tank 110 and the products of its dissociation and association are highly recycled. The same is true for the heat produced by the plasma explosions. A part of the explosion reaction heat (high temperature heat) is utilized through the thermo-impact dissociating hydrogen and oxygen ions, which ions return their energy to the HOPE when associating during the continuation of the reaction. Another part of the reaction heat (low temperature heat) is utilized for preliminary heating the water body incoming into transformers 05. This provides a significantly high efficiency of the HOPE.

An Exemplary HOPE Embodiment with a Four-Stroke Cycle

Figure 4:
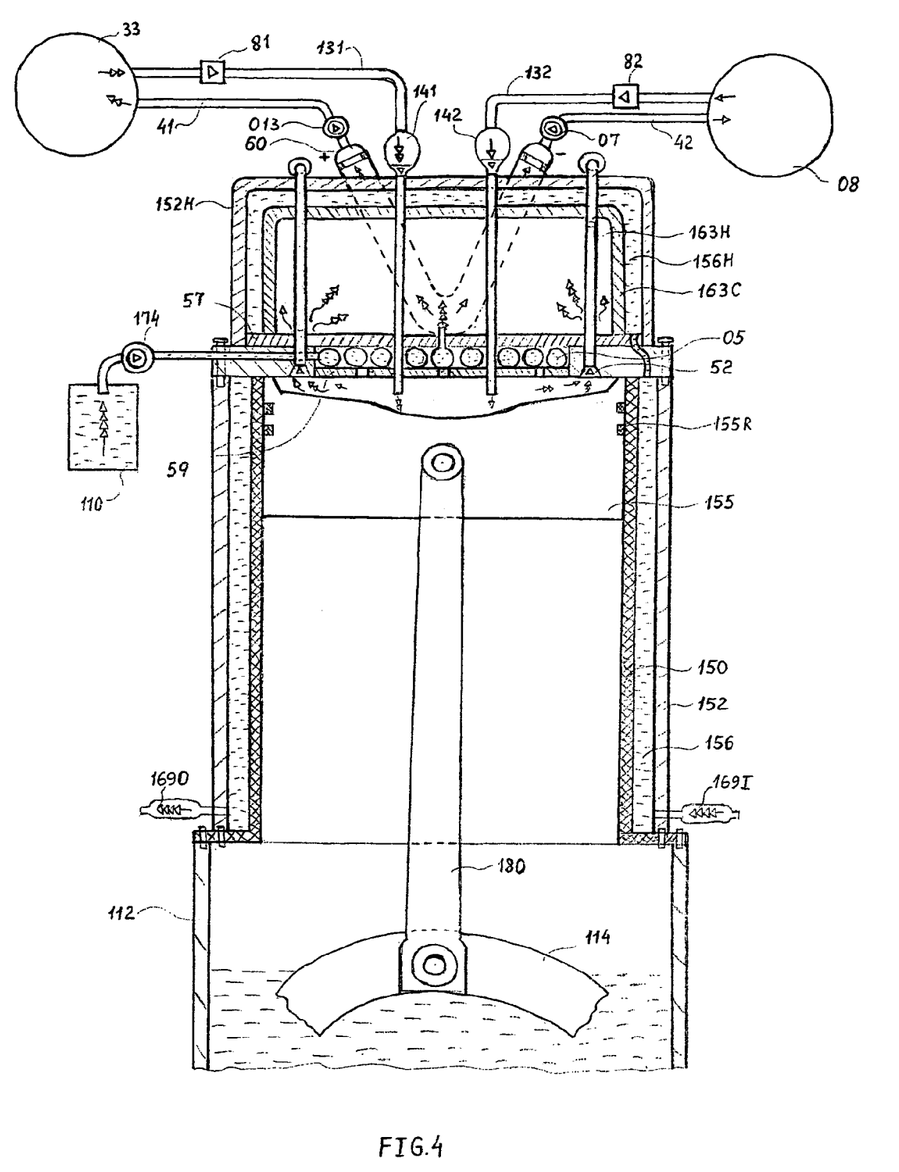
FIG. 4 illustrates a schematic view of a four-stroke HOPE used in combination with hydrogen and oxygen tanks and a sequential gases delivery system, according to an embodiment of the present invention.

FIG. 4 illustrates a HOPE embodiment utilizing a four-stoke cycle. It mostly comprises the same elements (with the same reference numerals) as the previous two-stroke cycle embodiment. The shape of the cylinder head is changed as depicted on FIG. 4. Only one divider 60 is implemented for all cylinders (in this embodiment the number of cylinders is intended to be four) and installed next to the last cylinder of the HOPE. The products of the explosion reaction inside internal cylinder 150 are output via valves 52 into inner space 163H, surrounded by a cooling liquid (water in this embodiment) of inner headspace 156H. Then the reaction products travel via a pipe (not shown), connected to inner space 163H, and via valve 023 (not shown on FIG. 4) into divider 60.

The major difference, however, is that valves 52 are mounted above the concavity of piston 155, communicating the concavity with inner space 163H. Therefore, inner space 163H receives the products of the explosion reaction output via valves 52 during the upward movement of piston 155. In this embodiment, valves 52 are coupled with a camshaft (not shown), according to a traditional construction of an internal combustion engine. This allows emptying the upper portion of cylinder 150 after the work stroke, and preparing it to the next cycle. The embodiment may use substantially the same dosing algorithm as described hereinabove for the two-stroke embodiment. Some embodiments may implement different means for regulating valves 52 and choosing the opening and shutting moments of valves 52 to finely tune the operation.

A Hope Embodiment Implementing the Sequential Gases Delivery System with a Hydrogen Tank and a Compressed Air Container This embodiment may be usable where the use of a compressed-oxygen tank is undesirable or unacceptable. It looks somewhat similar to the device described in the above discussed U.S. patent application Ser. No. 11/374779, but in fact uses a cardinally different method of the hydrogen and oxygen supply for combustion in the engine's cylinders, different means for delivering oxygen for the combustion, a different engine structure, and produces a different result increasing the efficiency of the engine.

As already mentioned, a random concentration of oxygen contained in a combustion mixture (hydrogen and air) cannot consistently provide a substantially high combustion level of hydrogen that reduces the efficiency of the engine operation. However, a special dosing method in conjunction with a compressed air supply means, enriched by the oxygen produced in the engine's divider, may be implemented to essentially achieve more complete combustion of hydrogen, which will reduce the consumption of hydrogen by the engine, and increase the efficiency of the HOPE using oxygen of air.

Figure 5:
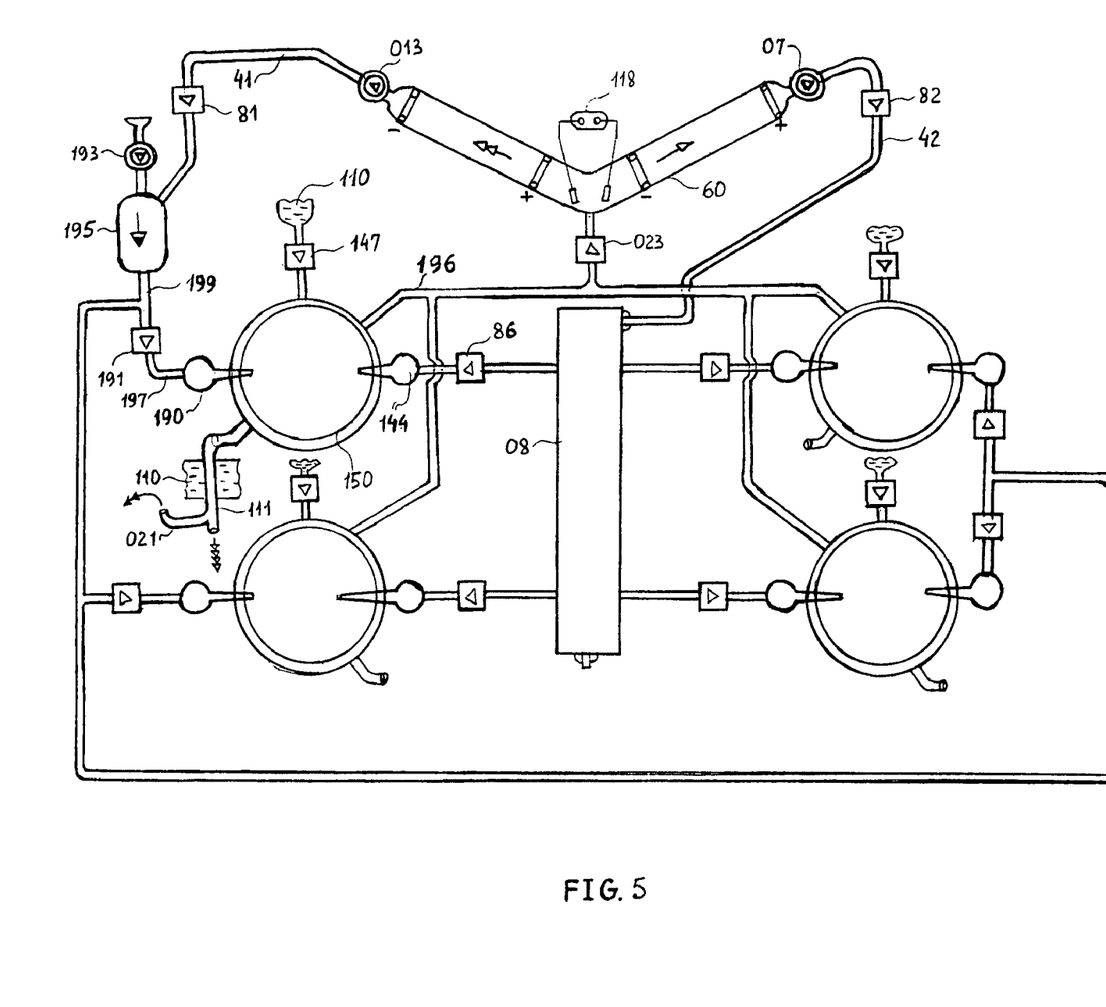
FIG. 5 illustrates a schematic view of a sequential air-hydrogen delivery system for the HOPE used in combination with a hydrogen tank and a compressed air container, according to an embodiment of the present invention.

An embodiment of the HOPE is illustrated on FIG. 5. It comprises a number of already disclosed elements, namely: tank 08 with compressed hydrogen, divider 60 with valve 023 and the electrolyzer including voltage terminal 118, hydrogen pump 07 via valve 82 and pipe 42 connected to hydrogen tank 08, oxygen pump 013 via pipe 41 connected to valve 81.

The HOPE embodiment comprises a number of identical cylinders 150. FIG. 5 shows four such cylinders. The cylinder construction depicted on FIG. 4 and described earlier herein may be exemplarily implemented for this embodiment with a slight modification: the products of combustion reaction within cylinder's internal space 163H exit via valves 52, a pipe (not shown) into an exhaust duct (discussed herein further), that is the pipe in this embodiment are not connected to valve 023 and divider 60.

Transformers 05 (reflected on FIG. 4) of cylinders 150 are supplied with water from a water tank 110 (partially shown on FIG. 5) via valve 147. Hydrogen and oxygen ions produced in transformers 05 due to said thermo-impact, are output via pipes (196), and valve 023 into divider 60.

The embodiment of HOPE comprises a number (four shown on FIG. 5) of hydrogen injection chambers 144, each connected via valve 86 to hydrogen tank 08. Chambers 144 includes pressure measuring means or sensors (not illustrated).

The embodiment of HOPE comprises a number (four shown on FIG. 5) of air injection chambers (190).

The HOPE embodiment comprises a container of compressed air (195) that may be charged for example on a special station. Container 195 is connected by a pipe (197) to a valve (191). Container 195 includes pressure measuring means or sensors (not illustrated). Thus, oxygen ions from divider 60 may be pumped by oxygen pump 013 via pipe 41 and valve 81 into air container 195 (called an enrichment herein further).

The embodiment includes an air pump (193), which may additionally supply compressed air in-taken from the atmosphere into air container 195. The compressed air of a predetermined pressure is delivered from air container 195 via valve 191, pipe 197 into chamber 190.

The embodiment comprises an exhaust duct (111) extended through a cooling device, in this embodiment represented by water tank 110. The exhaust products of the hydrogen-oxygen reaction contain water vapor, which is further condensed in exhaust duct 111 and recycled, for instance, into water tank 110, or otherwise. The exhaust heat may be utilized for initial heating of a water body flowing from tank 110 via valve 147 into transformer 05. The other reaction products (nitrogen oxides) are output via an exhaust pipe (021). In some embodiments the nitrogen oxides may be treated by a nitrogen oxide removal system exemplarily described in a U.S. Pat. No. 6,981,367 incorporated herein by reference, or by another such system.

The HOPE of the embodiment shown on FIG. 5, commences its operation by inletting hydrogen from tank 08 via valves 86 into chambers 144 to form a hydrogen dose, wherefrom the hydrogen dose is injected into cylinders 150 according to the described below dosing method, and the four-stroke cycle, particularly described above for the embodiment illustrated on FIG. 4. Compressed air is inlet into chamber 190 via pipe 199, valve 191, and pipe 197.

The control system (not illustrated) computes a compressed air dose for injection into chamber 190 based on the already computed hydrogen dose (in chamber 144) and on a concentration of oxygen contained in air container 195, for example, as prescribed herein below. The computed air dose is injected through chamber 190 into cylinder 150, according to the dosing method. The resultant mixture of the hydrogen and air doses is ignited by electrodes (similar to electrodes 141E shown FIG. 1 and described herein earlier), the combustion process launches in cylinders 150, and the HOPE starts operating.

The water body from tank 110 and via valve 147 (FIG. 5) is supplied into transformer 05 (see FIG. 4). When the transformer is heated by the reaction inside cylinder 150 up to the temperature essentially in a range from 800.degree. C. to 1000.degree. C., hydrogen and oxygen ions produced from the water body by aforesaid thermo-impact and water vapor are output via pipes 196, valve 023 into divider 60. Therein, the ions are separated as previously described. The vapor incoming via valve 023 in divider 60 is also dissociated into hydrogen and oxygen ions by the above-described electrolyzer within divider 60.

The hydrogen ions are pumped by pump 07 into tank 08 partially replenishing gaseous hydrogen consumed in cylinders 150 by the combustion reaction. The oxygen ions are pumped by pump 013 via valve 81 into air container 195, when the oxygen pressure in pipe 41 is higher than in container 195, increasing the oxygen concentration therein, i.e. enriching the compressed air. Some HOPE embodiments may include an intermediate oxygen container between pump 013 and valve 81. The control system via valve 191 inlets an air body enriched by oxygen into chamber 190. Doses of the enriched air are injected into cylinder 150, e.g. according to an algorithm disclosed below.

The corresponding hydrogen and enriched air doses are ignited in cylinders 150 inducing an explosion hydrogen-oxygen reaction, creating a torque of the HOPE, producing exhaust products (that may further be treated as described above), and heat (which is largely utilized for thermo-impact in transformer 05 and for initial heating up the water body incoming into transformer 05).

The operator (e.g. a motor vehicle driver) or remote commands may regulate the incoming hydrogen doses, which are further translated into signals for the control system that forms respective hydrogen doses for injection.

A Dosing Method for Oxygen Supplied from a Compressed Air Container

The purpose of such a dosing method is to provide a substantially optimum proportion of hydrogen supplied from tank 08 and air oxygen supplied from container 195, both shown on FIG. 5. Since air normally includes about 21% of oxygen and about 79% of nitrogen (other gases fractions may be not considered for the purposes of this calculation), 1 mass unit of air constitutes 1 fraction of oxygen (21%) and about 3.76 fractions of nitrogen (79%). Let's assume, an optimal ratio between the hydrogen reactant and oxygen reactant is still 1/8 in the presence of nitrogen (real values of the ratio are discussed below). For obtaining 8 mass units of oxygen necessary for reacting with 1 mass unit of hydrogen, the number of air mass units (an air-hydrogen ratio coefficient) should be: $(1+3.76)*8=38.08$.

Thus, measuring the hydrogen pressure difference before and at the end of an injection of a hydrogen dose in chamber 144 and multiplying the difference by the ratio coefficient 38.08, the control system may compute the air dose necessary for injecting from chamber 190 and reacting with the already computed dose of hydrogen.

When oxygen ions dissociated in divider 60 and pumped by pump 013 via valve 81 arrive into container 195, the air body contained in the container, e.g. having a pressure ($Pa1$) before, will be enriched by the arrived oxygen, and the air pressure in container 195 will also be increased to a pressure ($Pa2$).

Considering the container's air as ideal gas, a pressure difference ($Pa2-Pa1$) should be attributed only to the increase of the oxygen fraction mass. For example: an initial oxygen pressure in the container is $Po1=0.21*Pa1$. After the enrichment the air pressure in the container is increased by 10%, i.e. $Pa2=1.1*Pa1$. Then, an oxygen pressure after the enrichment ($Po2$) may be calculated as $Po2=0.21*Pa1+0.1*Pa1$, i.e. $0.31*Pa1$, and the corresponding oxygen percentage (31%) can now be memorized by the control system.

Now 1 mass unit of air in container 195 constitutes 1 fraction of oxygen (31%) and about 2.23 fractions of nitrogen (69%), so that for obtaining 8 mass units of oxygen necessary for reacting with 1 mass unit of hydrogen, the number of air mass units (the ratio coefficient) should be: $(1+2.23)*8=25.84$. Therefore, to calculate the ratio coefficient ($Rc$), one should obtain an actual fraction of oxygen ($Fo$) (it's convenient to set it to 1) and an actual fraction of nitrogen ($Fn$) (calculated based on the remaining percentage) in a mixture, add them up, and multiply the sum by the optimal ratio $Or$ (in this assumed example is set to 8, but in practice is determined as explained below), i.e. $Rc=Or*(Fo+Fn)$.

Suppose, the hydrogen injected dose is determined by a difference of hydrogen pressure measured in chamber 144: ($Ph2-Ph3$), wherein ($Ph3$) is a triggering pressure terminating the hydrogen dose injection, and ($Ph2$) is a pressure before the hydrogen dose injection. Then, the air pressure in container 195 will have to be changed as follows: $(Pa2-Pa3)=25.84*(Ph2-Ph3)$, wherein ($Pa3$) is a triggering air pressure in container 195 terminating the air dose injection. Therefore, the sought $Pa3=Pa2-25.84*(Ph2-Ph3)$, if the volumes of chamber 144 and container 195 are equal.

For a certain optimal ratio $Or$, a hydrogen volume $Vh$ and an air volume $Va$, a general formula follows: $(Pa2-Pa3)*Va=Or*(Fo+Fn)*(Ph2-Ph3)*Vh$. Hence, the triggering oxygen pressure is: $Pa3=Or*(Fo+Fn)*(Ph2-Ph3)*Vh/Va-Pa2$, or $Pa3=Rc*(Ph2-Ph3)*Vh/Va-Pa2$.

Thus, when the computed amount of $Pa3$ is reached, the air dose into chamber 190 should be terminated. Consequently, when the control system registers a pressure in container 195 equal $Pa3$, it issues a signal for shutting off valve 191. A corresponding dosing algorithm follows.

Optimal Ratio Coefficient Computing:

RC1. measure an air pressure ($Pa1$) of the air body contained in the container 195;

RC2. measure an oxygen ions pressure (Po) in the pipe 41;
RC3. when Po>Pa1 open valve 81, enrich the air mixture in the container, until Pa1=Po and shut valve 81;
RC4. measure a pressure (Pa2) of the air body contained in the container after the enrichment;
RC5. calculate an air pressure increase coefficient (Kai)=Pa2/Pa1−1;
RC6. calculate an oxygen concentration percentage (OP) in the container after the enrichment as follows: OP=(0.21+Kai)*100%;
RC7. calculate a nitrogen concentration percentage (NP) in the container after the enrichment as follows: NP=100%−OP;
RC8. set an oxygen fraction (Fo) after the enrichment as follows: Fo=1;
RC9. calculate a nitrogen fraction (Fn) in the container after the enrichment as follows: Fn=NP/OP;
RC10. obtain an optimal ratio (Or) from the test tables (explained further);
RC11. calculate the optimal ratio coefficient as follows: Rc=Or*(Fo+Fn);
RC12. memorize Rc, go to instruction (RC1).

Triggering Air and Hydrogen Pressures Computing:
TAH1. obtain a value of an air vessel volume (Va)—e.g. the volume of the compressed air container 195;
TAH2. obtain a value of a hydrogen vessel volume (Vh)—e.g. the volume of the hydrogen injection chamber 144;
TAH3. calculate a volume ratio as follows Rv=Vh/Va;
TAH4. measure a pressure (Ph2) of the hydrogen body in the hydrogen vessel;
TAH5. get a signal of a required hydrogen dose (RHD) and translate it into a triggering pressure (Ph3) of the hydrogen dose as follows: Ph3=Ph2−RHD/Vh;
TAH6. get a value of Rc from instruction (RC12);
TAH7. get a value of Pa2 from instruction (RC4);
TAH8. calculate a triggering pressure (Pa3) of the air dose as follows:

$$Pa3=Rc*(Ph2-Ph3)*Rv-Pa2;$$

TAH9. commence injecting of the hydrogen and air doses.

Accordingly, the design of injection chamber 190 should enable evacuating the chamber after each injection. For instance, chamber 190 may be designed in the form of a chamber cylinder and a chamber piston (not shown herein) actuated by an electromagnet (not illustrated) triggered by an injection signal from the control system. A preliminary formed air dose (computed according to the above algorithm) is first injected (e.g. during the time when the hydrogen dose is being injected into the HOPE cylinder) into chamber 190 via pipe 197 connected, for example, to the sidewall of the chamber cylinder. The preliminary air dose is kept in chamber 190 until the electromagnet, receiving the injection signal and pushing the chamber piston, opens an outlet diaphragm (not shown) of chamber 190 to output the air dose into the HOPE cylinder. After the injection, the diaphragm closes, the piston returns to its initial position waiting for the next injection signal. The injection is followed by an ignition pulse of an igniting electrode disposed in chamber 190 close to the diaphragm. Chamber 190 is evacuated and waiting for the next preliminary dose. The hydrogen injection chamber 144 may be similarly configured. Different HOPE embodiments may utilize other suitable chamber designs.

Normally the frequency of injections will be much greater than the frequency of opening valve 81, i.e. enrichment doses. Therefore, the CPU of the control system will use the same ratio coefficient (25.84 in the above example) until the next portion of oxygen will arrive from divider 60 via valve 81 and subsequently will additionally enrich the air in container 195. A new ratio coefficient will then be computed in a similar fashion and memorized by the CPU, and will be used for computing of air doses until the next enrichment.

The calculations of the ratio coefficient might be affected by several factors, such as a temperature regime of the HOPE, which in turn might depend on a particular design of the HOPE embodiment. For instance, where the reaction temperature is higher than about 1500.degree. C., nitrogen will react with oxygen of the air mixture. This means that the optimal ratio (corresponding to a maximum energy output for the reaction) of one hydrogen mass unit to the number of oxygen mass units contained in a certain air body mass might substantially differ from 1/8, and should be finally determined during tests for a particular design of the HOPE and obtaining the actual characteristics.

For example: an optimal ratio characteristic is determined as a ratio of changing air doses in response to a certain hydrogen dose, while keeping the oxygen concentration in the air doses constant, and measuring a maximum engine's torque for the hydrogen dose. Once the maximum torque is reached, the optimal ratio for the oxygen concentration is recorded, and the concentration may be increased for determination of the next optimal ratio characteristic. The tests may continue until the oxygen concentration becomes 100%. Thereafter the hydrogen dose may be increased that may raise the reaction temperature and a new family of optimal ratio characteristics can be taken, etc. The torque may be measured, for example, by utilizing a motor-electro-generator pair with variable electrical load to imitate different mechanical loads for the engine. The torque is related to the generator's current depending on the generator design. Based on the tests data, a table (or tables) of optimal ratios should be compiled. For some HOPE embodiments, the optimal ratios table might be computed theoretically with or without computer calculations, but should be practically tested anyway.

The test table may be converted into an electronic form (a memory chip, a software storage, etc.) and eventually incorporated into a computer program, which will insert the value of the optimal ratio, corresponding to the current regime parameters, into the formula: the ratio coefficient will be calculated by multiplying the sum of oxygen and nitrogen fractions in the air container by the optimal ratio, as exemplified above. The HOPE embodiment will have to include respective types of conventional means (not shown) to measure the parameters e.g. a sensor measuring the temperature in the cylinder, pressure sensors, etc.

Hope Embodiments Utilizing Different Combinations of Hydrogen-Air Delivery Systems with Modified Dosing Methods.

A modification of the previously disclosed embodiment may be implemented by making container 195 (FIG. 5) an intermediate vessel for storing and enrichment of air. A primary air vessel (not shown) would be installed and situated between container 195 and pump 193, and would be connected to container 195 via an intermediate valve. Opening of the intermediate valve will be followed by a reduction of the ratio coefficient, so that it should be re-calculated each time for each such opening. The primary air vessel may be used not only for air supply to container 195, but also for other purposes, e.g. for starting a car by means of a pneumatic servomotor fed from such primary air vessel.

Analogously, an intermediate oxygen vessel (not shown) may be conveniently arranged between pump 013 and valve

81 (FIG. 5) to temporary store compressed ionized hydrogen before actuation of an enrichment oxygen flow via valve 81 into container 190.

Another modification of the HOPE utilizing hydrogen and compressed air (not illustrated) may use the parallel delivery system reflected on FIG. 2 and described hereinabove, but altered to adapt to and incorporate the compressed air container. The alterations are (FIG. 5): removing valves 83 (I and II), pipes 41 (I and II), valves 84 (I and II), and pipes 42 (I and II); substituting tank 33 for container 195, and chambers 143 (I and II) for chambers 190 (I and II), which alterations are not illustrated herein.

Accordingly, the dosing method may be altered. The embodiment may use all available pressure in ion receiving chambers 141 (I and II) and 142 (I and II). If, e.g. the hydrogen pressure in chambers 142 (I and II) is not sufficient, the control system may firstly inject a first ionized hydrogen dose from chamber 142 (I and II), and secondly may additionally open valves 86 (I and II) injecting a second hydrogen dose from chamber 144 (I and II).

In a similar fashion, the CPU computes a first oxygen ions dose to be injected from chambers 141 (I and II), based on the current available pressure oxygen pressure in the chambers. An additional air dose should be injected from chambers 190 (I and II). The ratio coefficient for the air dose can be for simplicity calculated based on the stored optimal ratio value for the current regime parameters (from the test table) and the current oxygen concentration in the compressed air container. More complex algorithms may be implemented for computing the expected concentration of oxygen in the cylinder resulting from the ions oxygen injection and the air injection. The ratio coefficient for chambers 190 (I and II) should be calculated for each oxygen enrichment dose, as prescribed above.

The use of ionized hydrogen in chambers 142 and ionized oxygen in chambers 141 is preferable for the reasons of avoiding or reducing the involvement of nitrogen, and utilizing the energy of ionized particles for intensification of the explosion reaction.

The dosing methods may be applied not only to compressed air as a source of oxygen, but also to any other mixtures containing an oxygen component. The same is true for the hydrogen supply.

EXEMPLARY RAMIFICATIONS OF THE PRESENT INVENTION

Different designs of HOPEs may be proposed for some special purposes. For example, an upper compartment (not illustrated) may be arranged in the cylinder head, above transformer 05 (FIG. 3). A primary upper transformer, similar and in addition to the lower (secondary) transformer 05 may be disposed in the upper compartment. The primary transformer would be separately connected to a water supply. High temperature gases can be input in the upper compartment from any suitable source. Such embodiment may be usable in installations producing high temperature heated gases, for example side gases from oil wells, gaseous products of industrial chemical reactors, melting furnaces, gas turbines, etc. Additional transformers may be arranged also under cylinder 150, in the space between cylinder 150 and 152 (see, for example, FIG. 3), or outside the HOPE, delivering the dissociated ions into the corresponding injection chambers.

HOPE embodiments may be designed for utilizing exhaust gases of a traditional internal combustion or diesel engine, resulting in reduction of its hydrocarbon fuel consumption. The temperature of such gases needs to be reduced, and this can be done not only by traditional water heater means, but also utilizing aforesaid thermo-impact, resulting in dissociation of water into hydrogen and oxygen ions, which ions are then fed back into corresponding chambers of the HOPE. In such an embodiment, the HOPE would drive a generator for an additional power supply, provide an additional torque, or be used otherwise. Some solar power converters or radioactive devices may be implemented to heat up the transformers in other HOPE embodiments. The HOPE may be implemented for fire extinguishing devices (for example, for self-moving robots—firefighters). Considering high recycle-ability of the HOPE, it may find use in aircraft, spacecraft, submarines, etcetera.

HOPE embodiments may also be adapted for use with a primary fuel, another than hydrogen, and an oxygen-containing mixture, injected into the cylinders, in corresponding combinations with hydrogen and oxygen ions generated in the divider and injected into the cylinders in parallel with the primary fuel and the oxygen-containing mixture (e.g. using the aforementioned parallel delivery system); or the generated hydrogen and oxygen ions are mixed with the primary fuel and the oxygen-containing mixture respectively before injecting into the cylinders (using the aforementioned sequential delivery system). Other hybrid delivery systems may also be utilized.

We claim:
1. An apparatus for obtaining mechanical power or torque comprising:
   an engine unit, including a predetermined number of cylinders coupled with cylinder heads;
   water supply means at least for supply of a water body;
   ions producing means including
      a predetermined number of transformers configured to dissociate the water body at least into hydrogen ions and oxygen ions by subjecting the water body to thermo-impact caused by combustion products of a combustion reaction taking place in said cylinders, the combustion products having a temperature in a predetermined temperature range, said transformers each substantially disposed in an internal space of each said cylinder heads;
      a number of ionic dividers, each configured to separate at least said hydrogen ions and said oxygen ions, said number of ionic dividers each communicated with said predetermined number of transformers, said number of ionic dividers configured to receive at least the hydrogen and oxygen ions from the transformers;
      a hydrogen pump means configured to pump at least the hydrogen ions out of said number of ionic dividers; and
      an oxygen pump means configured to pump at least the oxygen ions out of said number of ionic dividers;
   hydrogen supply means;
   oxygen-containing supply means;
   hydrogen injection means including
      a number of hydrogen injection chambers controllably connected to said hydrogen pump means to receive hydrogen ions, and configured to inject said hydrogen ions into the top region of each said cylinder;
      a number of hydrogen injection chambers controllably connected to said hydrogen supply means and configured to inject a hydrogen dose into the top region of each said cylinder;
   at least oxygen injection means including
      a number of oxygen injection chambers controllably connected to said oxygen pump means to receive said oxygen ions, and configured to inject said oxygen ions into the top region of each said cylinder;
a number of oxygen injection chambers controllably connected to said oxygen-containing supply means and configured to inject at least an oxygen dose into the top region of each said cylinder;
controlling means for control of at least the flows of said water body, and said hydrogen ions, and said oxygen ions.

2. The apparatus according to claim 1, wherein:
said engine unit including
a number of exhaust valves communicating the top region of each said cylinder with an inner space of the corresponding cylinder head, wherein the inner space further communicating with one of said number of ionic dividers.

3. The apparatus according to claim 2, further comprising at least one of the following:
a cooling means including a cooling liquid being water; and
a lubricating means being water.

4. The apparatus according to claim 1, wherein
said engine unit including
a number of substantially cylindrically shaped solid pistons each slidely disposed in each of said cylinders, the pistons having a predeterminedly shaped concavity on its top base, and having a predetermined height: the pistons each capable of reciprocating linear movement within the cylinder from a highest position substantially in the top region of the cylinder to a lowest position substantially in the bottom region of the cylinder; and
a number of exhaust valves mounted in the lower region of the cylinder on the cylinder's sidewalls predeterminedly above the top base of the piston when situated in its lowest position, communicating the lower region of the cylinder with an inner space of the corresponding cylinder head through a pipe situated outside the cylinder, wherein the inner space further communicating with one of said number of ionic dividers.

5. A method for obtaining an explosive combustion reaction in an engine between a hydrogen body and an oxygen body comprising the acts of
providing an engine unit, including a predetermined number of cylinders;
providing said hydrogen body and said oxygen body;
providing dissociation means for dissociating water;
producing a hydrogen ions body by the dissociation means;
producing an oxygen ions body by the dissociation means;
controllable imparting said hydrogen ions body into said hydrogen body;
controllable imparting said oxygen ions body into said oxygen body;
providing hydrogen injection means configured for receiving and injecting a hydrogen dose, being a portion of said hydrogen body or a portion of said hydrogen ions body, into said cylinders;
providing oxygen injection means configured for receiving and injecting an oxygen dose. being a portion of said oxygen body or a portion of said oxygen ions body, into said cylinders;
providing controlling means for control of at least the engine unit, the hydrogen injection means, and the oxygen injection means; said controlling means configured at least to store a dosing algorithm means for at least a computation, actuation, and termination of said hydrogen dose and said oxygen dose; said controlling means configured at least to form the hydrogen dose corresponding to a required hydrogen dose and according to said dosing algorithm means; and said controlling means configured at least to form the oxygen dose corresponding to the hydrogen dose and according to said dosing algorithm means;
delivering said hydrogen dose to said hydrogen injection means;
delivering said oxygen dose to said oxygen injection means;
receiving a signal by said controlling means, said signal carrying information about a commencement and a required intenseness of the explosive combustion reaction, translated into said required hydrogen dose by said controlling means: and
injecting the hydrogen dose by said hydrogen injection means, and injecting said oxygen dose by said oxygen injection means into the cylinders, according to said dosing algorithm means, thereby producing the explosive combustion reaction.

6. A method for obtaining an explosive combustion reaction in an engine between a hydrogen body and an air body comprising the acts of
providing an engine unit, including a predetermined number of cylinders;
providing said hydrogen body and said air body;
providing dissociation means for dissociating water;
producing a hydrogen ions body by the dissociation means;
producing an oxygen ions body by the dissociation means;
controllably imparting said hydrogen ions body into said hydrogen body;
controllably imparting said oxygen ions body into said air body;
providing hydrogen injection means configured for receiving and injecting a hydrogen dose, being a portion of said hydrogen body, into said cylinders;
providing air injection means configured for receiving and injecting an air dose, being a portion of said air body, into said cylinders;
providing controlling means for control of at least the engine unit, the hydrogen injection means, and the air injection means; said controlling means configured at least to store a dosing algorithm means for at least a computation, actuation, termination of said hydrogen dose and said air dose, and for control of the imparting said hydrogen ions body into said hydrogen body and the imparting said oxygen ions body into said air body; said controlling means configured at least to form the hydrogen dose corresponding to a required hydrogen dose and according to said dosing algorithm means; and said controlling means configured at least to form the air dose corresponding to the hydrogen dose and according to said dosing algorithm means;
delivering said hydrogen dose to said hydrogen injection means;
delivering said air dose to said air injection means;
receiving a signal by said controlling means, said signal carrying information about a commencement and a required intenseness of the explosive combustion reaction, translated into said required hydrogen dose by said controlling means; and injecting the hydrogen dose by said hydrogen injection means, and injecting said air dose by said air injection means into the cylinders, according to said dosing algorithm means, thereby producing the explosive combustion reaction.

* * * * *